United States Patent
Van Vleet

[19]

[11] Patent Number: 5,823,560
[45] Date of Patent: Oct. 20, 1998

[54] TWO WAY CUSHIONING TRAILER HITCH

[76] Inventor: Robert D. Van Vleet, 405 12th St., Sidney, Nebr. 69162

[21] Appl. No.: 867,211

[22] Filed: Jun. 2, 1997

[51] Int. Cl.$^6$ ....................................................... B60D 1/30
[52] U.S. Cl. .......................... 280/484; 280/483; 280/485; 280/511
[58] Field of Search ..................................... 280/483, 484, 280/485, 486, 487, 490.1, 511

[56] References Cited

U.S. PATENT DOCUMENTS

| | | | |
|---|---|---|---|
| 2,127,689 | 2/1938 | Johnson | 280/484 |
| 2,287,234 | 6/1942 | Ducharme | 280/483 |
| 3,345,081 | 10/1967 | Hartwig | 280/487 |
| 3,708,183 | 1/1973 | Jones | 280/483 |
| 3,904,226 | 9/1975 | Smalley | 280/486 |
| 4,056,155 | 11/1977 | Wahl | 177/145 |
| 4,148,498 | 4/1979 | Taylor, Jr. | 280/482 |
| 4,215,876 | 8/1980 | Jacks | 280/483 |
| 4,351,542 | 9/1982 | Lovell et al. | 280/489 |
| 4,746,138 | 5/1988 | James | 280/487 |
| 4,773,668 | 9/1988 | Muonro | 280/485 |
| 4,817,978 | 4/1989 | James | 280/487 |
| 4,978,133 | 12/1990 | Thorne et al. | 280/484 |
| 5,380,030 | 1/1995 | Gullickson | 280/486 |
| 5,683,094 | 11/1997 | Gulickson | 280/485 |

*Primary Examiner*—Anne Marie Boehler
*Assistant Examiner*—Michael Cuff
*Attorney, Agent, or Firm*—Greer, Burns & Crain, Ltd.

[57] ABSTRACT

Trailer hitch apparatus including dampening mechanisms to simultaneously dampen vibration and shock in a longitudinal direction and vertical direction. The apparatus consists of a hollow draw bar tube capable of being removably coupled to a vehicle mounted receiving tube. The draw bar tube is adapted to move longitudinally relative to the receiving tube while a biasing means within the draw bar tube provide dampening of shock and vibration in the longitudinal movement. The apparatus further has a ball hitch assembly carried by a transverse support bar attached to an outer portion of the draw bar tube. The ball hitch assembly is biased against vertical movement thereby dampening shock and vibration in the vertical direction.

16 Claims, 3 Drawing Sheets

5,823,560

TWO WAY CUSHIONING TRAILER HITCH

The present invention relates to improvements in trailer hitches. Specifically, the present invention is directed to an improved trailer hitch which provides for the dampening of shock and vibration normally associated with towing a trailer. The hitch has the ability to dampen shock and vibration in a longitudinal direction while simultaneously providing for dampening in the vertical direction.

Conventional trailer hitches generally include a rigid support structure attached to a towing vehicle. A ball hitch connector mounted to the rigid structure engages a correspondingly shaped coupling, generally referred to as a tongue, on the towed vehicle or trailer. This creates a pivotal but rigid towing system. This rigid system transmits shock and vibration between the trailer and the towing vehicle.

The shock and vibration have numerous sources. Upon acceleration or deceleration of the towing vehicle, fore-and-aft loads are longitudinally transmitted from the trailer to the towing vehicle. A driver commonly experiences theses forces as jerking starts and stops. Further, bumps and ruts in a towing surface subject a towing vehicle and trailer to vertical shock and vibration. These vertical forces are transferred between the vehicle and trailer through the trailer hitch. It is well known that undue wear and damage to the towing vehicle, the hitch and the trailer result from the continuous shock and vibration commonly associated with towing a trailer.

To overcome the problems associated with shock and vibration, trailer hitches with various dampening mechanisms have been proposed in the prior art. Previously proposed hitches with dampening mechanisms have addressed vibration and shock absorption in either the vertical or longitudinal direction. One such system has been disclosed in U.S. Pat. No. 4,817,978 by James. The system disclosed therein includes a series of resilient blocks within the towing bar to dampen fore-and-aft vibration. Another system as disclosed in U.S. Pat. No. 4,773,668 by Muonro provides for dampening on a vertical axis by means for a resilient bushing inserted into the draw bar of a trailer hitch.

It is a primary object of the present invention to provide an improved trailer hitch whereby vertical and fore-and-aft vibration and shock are absorbed or reduced simultaneously.

Another object is to provide for an improved trailer hitch capable of simultaneously absorbing vertical and fore-and-aft vibration and shock which is of simplistic design with a minimum number of components allowing for a low manufacturing cost.

Yet another object of the invention is to provide an improved trailer hitch which is easily attached to and removed from a receiver tube of a towing vehicle.

Still another object of the invention is to provide an improved trailer hitch with a load gauge capable to displaying the vertical load on the hitch.

It is still another object of the invention to provide an improved trailer hitch which is adapted to receive a conventional ball hitch connector.

These and other objects will become apparent upon reading the following detailed description of the present invention, while referring to the attached drawings, in which.

DETAILED DESCRIPTION OF THE INVENTION

The present invention relates to an improvement in the design of a trailer hitch whereby shock and vibration between a towed vehicle and trailer are dampened in both the longitudinal and vertical direction. This invention has the advantage of offering maximum reduction in vibration and shock because of its two way cushioning effect. Further, the simplicity of the invention's design allows for cost effective manufacture.

Broadly stated, the present invention provides for an apparatus to be removably coupled to a vehicle mounted receiver tube with at least one aperture. The apparatus consists of an elongated hollow draw bar tube with at least one aperture. A slide block with a bore inside the draw bar tube is adapted to move longitudinally relative to the draw bar tube. A retaining means through the apertures and bore holds the slide block stationary relative to the receiving tube. This allows the draw bar to move longitudinally relative to the receiving tube. A biasing means within the draw bar tube provides a resistance against longitudinal movement. This provides for dampening of fore-and-aft vibration and shock. The apparatus further has a ball hitch assembly carried by a traverse support bar attached to an outer end portion of the draw bar tube. The ball hitch assembly is biased against vertical movement thereby dampening shock or vibration in the vertical direction. The combination of the longitudinal and vertical biasing mechanisms provides for superior shock and vibration absorption. The hitch also includes a load gauge for estimating the vertical load on the trailer hitch.

Figure 1:
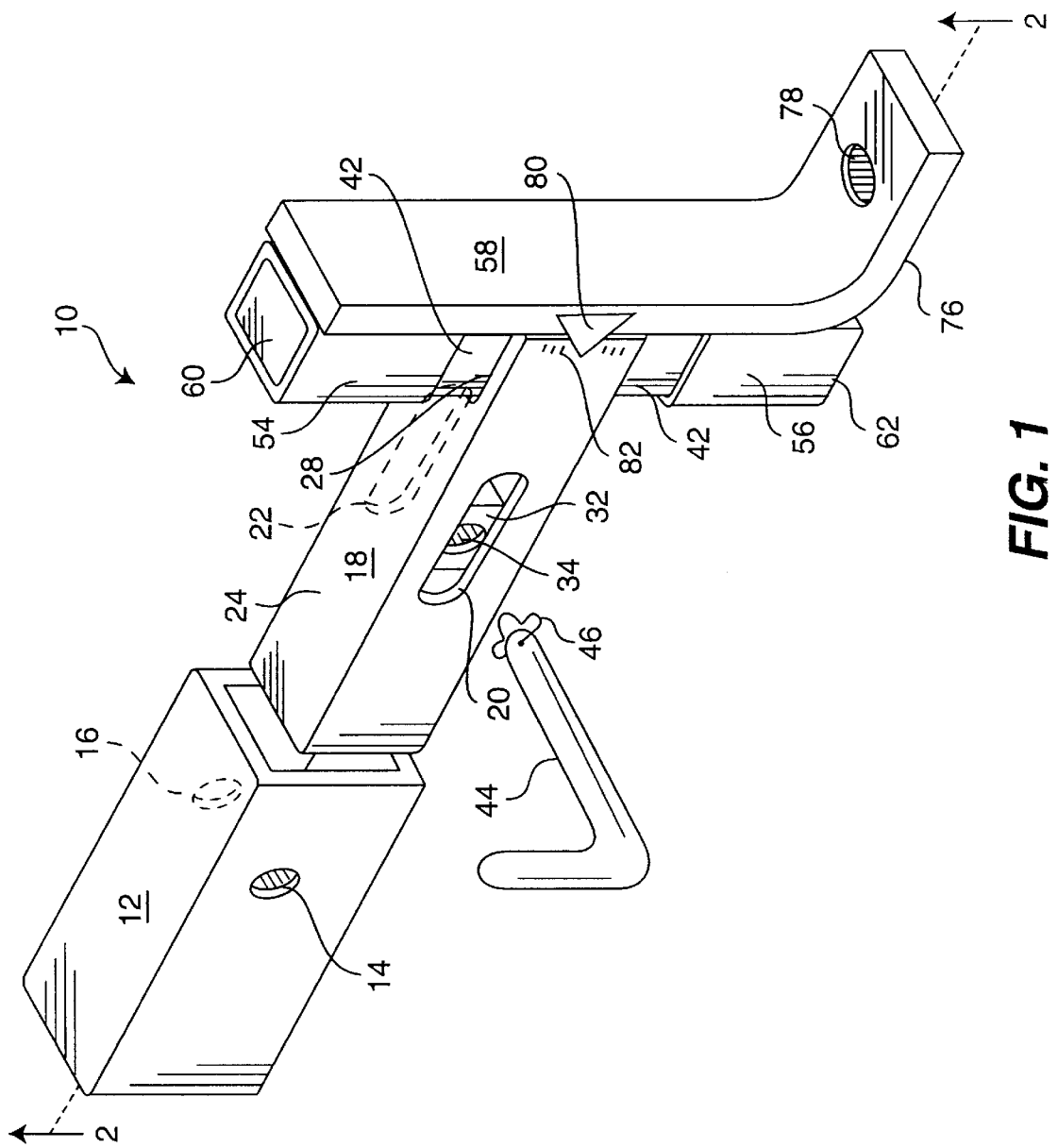
FIG. 1 is a three dimensional view of the trailer hitch apparatus and receiving tube.

Turning now to the drawings, FIG. 1 generally shows the apparatus 10 and a receiving tube 12. A pair of transverse apertures 14 and 16 (shown hidden) are present in the walls of the receiving tube 12. The receiving tube 12 may be mounted on a towing vehicle in any number of ways depending upon the configuration of the towing vehicle. Most commonly, it is bolted to the frame of the towing vehicle and it is contemplated that it any means which provides a safe and secure connection is appropriate.

Figure 2:
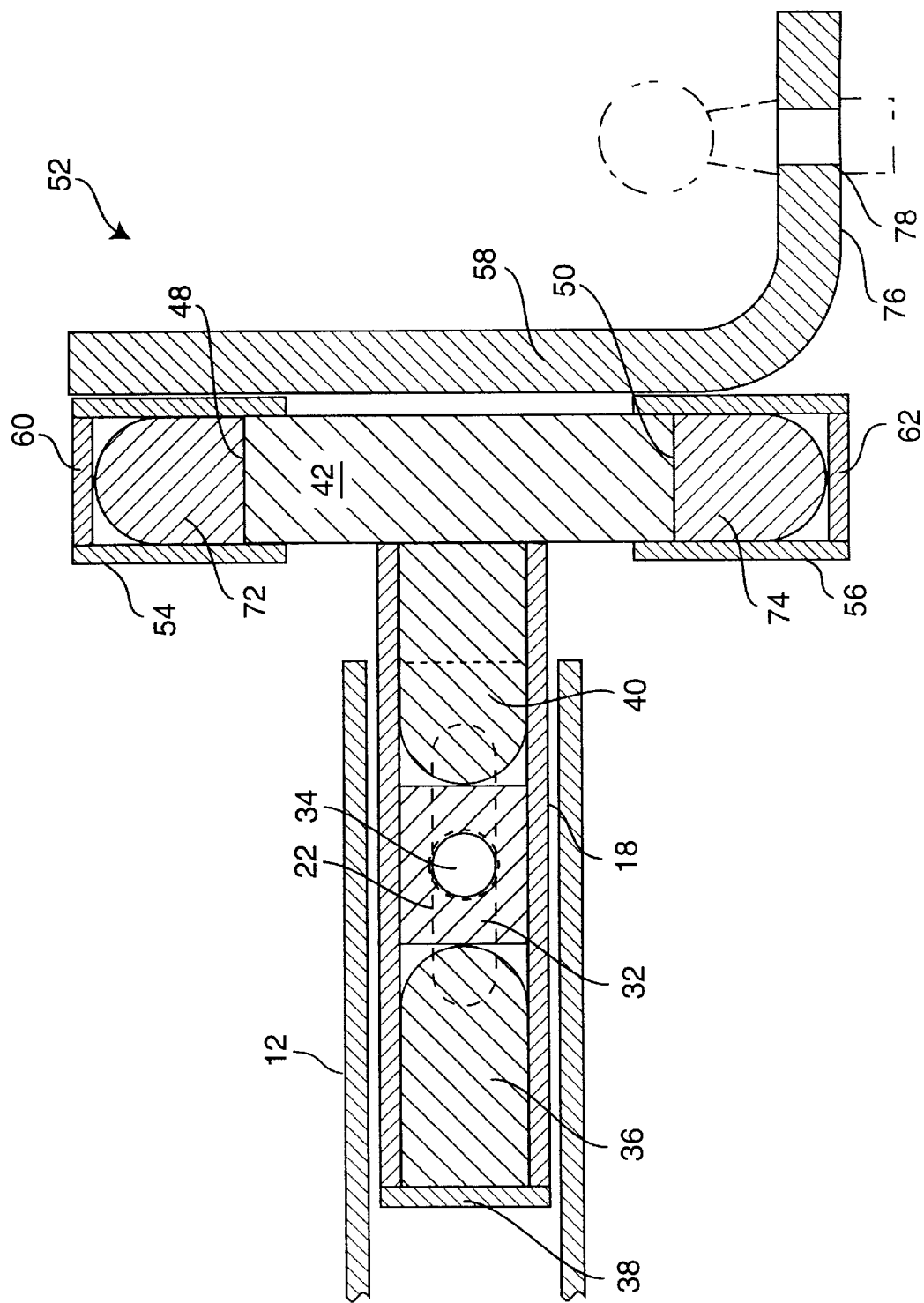
FIG. 2 is a cross sectional side view of the apparatus taken generally along line 2—2 of FIG. 1.
Figure 3:
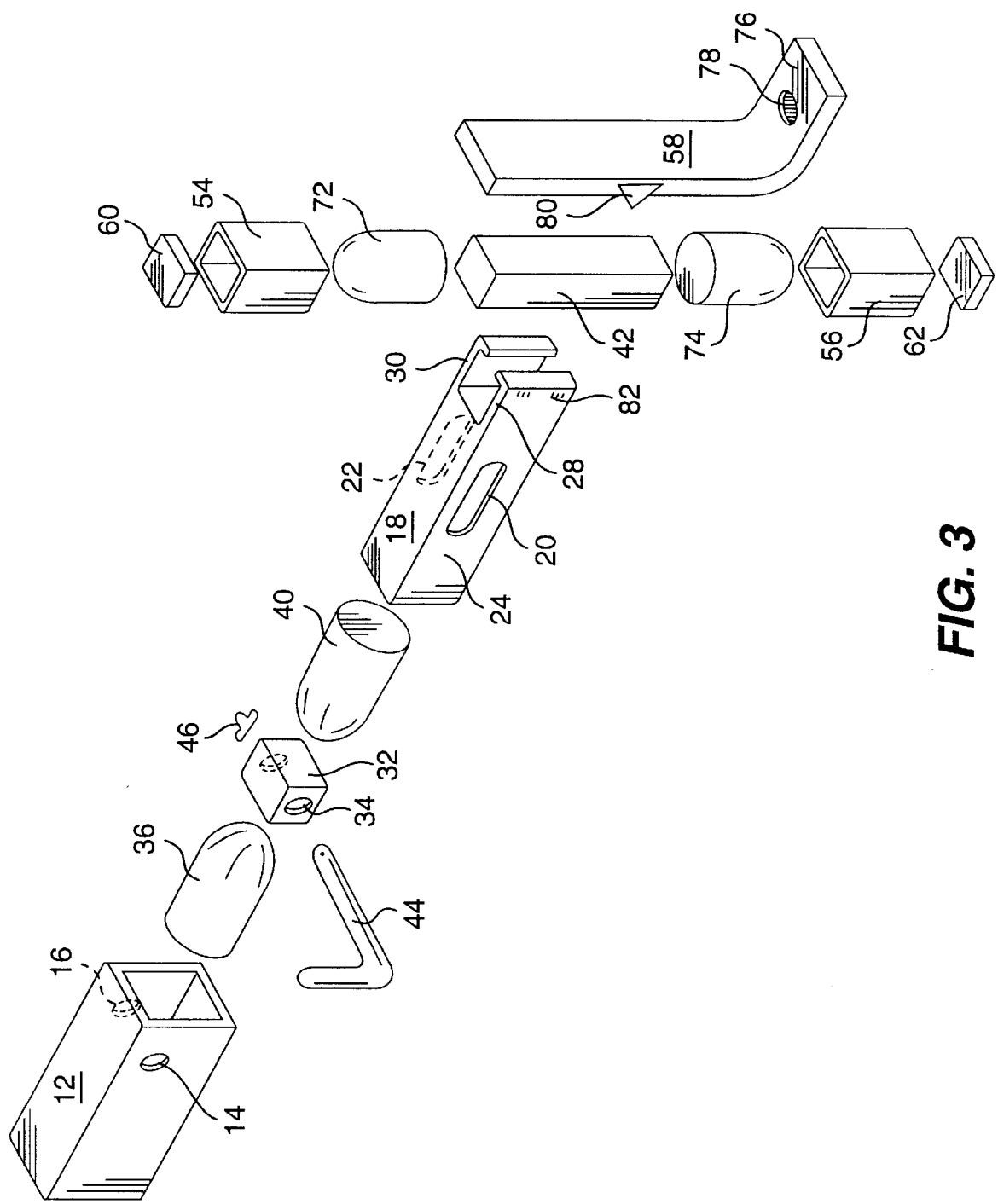
FIG. 3 is an exploded view of the apparatus.

FIGS. 1, 2 and 3 show a hollow draw bar tube 18 with a pair of transverse apertures 20 and 22 present in a first side wall 24 and a second side wall 26 (not shown) of the draw bar tube 18. A first side wall extension 28 and a second side wall extension 30 extend from one end of the draw bar tube 18. The draw bar tube 18 is configured to be closely and slidably received by the receiving tube 12 as depicted in FIG. 1. The draw bar tube 18 is contemplated to be made of heavy gauge metal tubing which provides an appropriate strength for the application. It should be understood that while the receiving tube 12 and the draw bar tube 18 are shown to be generally square, they can have many cross sectional profiles including round, triangular, hexagonal and the like. Further, the two apertures 14 and 16 defining circles and the two apertures 20 and 22 defining elongated slots constitute the preferred embodiment of the invention. However, certain applications may require only one aperture 14 or 16 and one aperture 20 or 22 as well as various other aperture shapes.

Within the draw bar tube 18 is a slide block 32. A bore 34 in the slide block 32 is axially aligned with the slots 20 and 22. A front dampening member 36 is retained within the draw bar tube 18 by a front wall 38 and the slide block 32. Likewise, a rear dampening member 40 is retained in draw bar tube 18 by slide block 32 and a transverse support bar 42 which defines a rear wall of draw bar tube 18.

Once draw bar tube 18 is inserted into the receiving tube 12, the draw bar tube 18 is retained within the receiving tube 12 with a conventional hitch pin 44. The hitch pin 44 extends through the apertures 14, 16, 20, and 22 and the bore 34. Accordingly, the slide block 32 is held stationary relative to the receiving tube 12 while moving longitudinally relative to the draw bar tube 18. This allows for the draw bar tube 18 to be longitudinally movable within the receiving tube 12. The dampening cushions 36 and 40 bias the movement of the draw bar tube 18. Additionally, the size of the apertures 20 and 22 determine the limits of the longitudinal movement of the draw bar tube 18 relative to the receiving tube 12 assuring that the receiving tube 12 does not contact the transverse support bar 42. The hitch pin 44 is secured with a hair pin 46.

The transverse support bar 42 has an upper end 48 and a lower end 50. The support bar 42 is secured to the outer end of the draw bar tube 18 between the first side wall extension 28 and the second side wall extension 30. It is preferred that transverse support bar is solid steel stock and attached to the draw bar tube 18 by conventional weldment.

A ball hitch assembly indicated generally at 52 includes an upper housing 54, a lower housing 56 and a mounting element 58. The upper and lower housings 54 and 56 are suitable heavy gauge steel stock tubing similar to the draw bar tube 18. Each housing 52 and 54 are open at one end and closed at the other by plates 60 and 62 with conventional weldment. The upper housing 54 closely and slidably receives the upper end 48. The lower housing 56 closely and slidably receives the lower end 50. An upper dampening cushion 72 is confined within the upper housing 54 and a lower dampening cushion 74 is confined within the lower housing 56.

The mounting element 58 is attached to the upper housing 54 and the lower housing 56 by conventional weldment. Accordingly, the ball hitch assembly 52 is biased against vertical movement by the upper cushion 72 and the lower cushion 74. A horizontal ball plate 76 extends from the mounting element 58. A bore 78 in ball plate 76 allows for a ball hitch connector (shown in dotted lines) to be attached to the ball plate 76 for connection to a conventional trailer tongue (not shown).

The dampening members 36, 40, 54 and 56 are bullet-shaped polyurethane cushions. The bullet shape allows for the cushions to be resiliently deformed providing a partial resistance to the movement of the draw bar tube 18 or the ball hitch assembly 52. The durometer of the polyurethane cushions is preferably between 68 and 100. Clearly, it should be appreciated that, in place of the cushions, any number of resilient materials or structures could be used including springs. Further, although support bar 42 and housings 54 and 56 are preferably rectangular in nature, any appropriately dimensioned material can be used as described for draw bar tube 18.

In the preferred embodiment of the invention, the ball hitch assembly 52 is assembled in a manner which places a preload on the cushions 72 and 74. The preload limits the movement of the ball hitch assembly and prevents the ball hitch assembly from moving to far in one direction which would cause either the upper or lower housing to disengage from the transverse support bar.

A load gauge comprises an indicator 80 and a scale 82. The scale 82 is marked on the first or second side wall extensions 28 or 30. The indicator 80 is attached to the transverse support bar 42 as the same side as the scale 82. Ideally, a load on a trailer is balanced over the wheels of the trailer and no vertical load is placed on the trailer hitch. Therefore, the load gauge will maintain a position in the middle of the scale. A load that is too far forward on a trailer will cause the indicator 80 to move downwardly along the scale 82. In the event a trailer load is too far rearward, the indicator will have move upwardly. Increments on the scale show the estimated the load in pounds.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Trailer hitch apparatus adapted to be removably coupled to a vehicle mounted receiver tube which has at least one aperture in an outer wall thereof for receiving a retaining means for locking said apparatus to the tube, said apparatus being adapted to have a ball hitch connector mounted thereto, said apparatus comprising:

an elongated hollow draw bar tube adapted to be inserted within the receiver tube, said draw bar tube having an outer wall with at least one aperture therein, a hollow interior and a slide block in said interior adapted to move longitudinally therein;

a retaining means adapted to fit within at least one aperture in the receiver tube and said at least one aperture in said draw bar tube;

said slide block having a bore adapted to receive said retaining means that extends through at least one aperture of the receiving tube and said at least one aperture of said draw bar tube, said slide block being adapted to move longitudinally relative to said draw bar tube while being held stationary relative to the receiver tube by said retaining means;

a first biasing means associated with said draw bar tube for biasing said slide block against longitudinal movement;

a vertically oriented elongated support bar attached to an outer end portion of said draw bar tube, said support bar being generally transverse to said draw bar tube and having an upper end and a lower end; and a ball hitch assembly carried by said support bar and being generally slideably vertically moveable relative thereto, said ball hitch assembly having upper and lower housing portions that overlie said upper end and said lower end of said support bar, and having a mounting element adapted to receive a ball hitch connector, said assembly including a second biasing means located between said upper housing and said upper end and between said lower housing and said lower end for biasing said assembly against vertical movement.

2. The trailer hitch as in claim 1 wherein said first biasing means comprises a front wall and a rear wall of said draw bar tube, a front dampening member located between said front wall and said slide block and a rear dampening member located between said slide block and said rear wall.

3. The trailer hitch as defined in claim 2 wherein said front and rear dampening members comprise resilient solid cushions.

4. The trailer hitch as defined in claim 3 wherein said cushions are polyurethane.

5. The trailer hitch as defined in claim 3 wherein said cushions are bullet-shaped.

6. The trailer hitch as defined in claim 1 wherein said draw bar tube has two apertures disposed opposite one another in said outer wall, said apertures comprising elongated slots.

7. The trailer hitch as defined in claim 1 wherein said draw bar tube is substantially rectangular.

8. The trailer hitch as defined in claim 1 wherein said retaining means is a hitch pin.

9. The trailer hitch as defined in claim 1 wherein said ball hitch assembly further comprises:

said upper housing having an open bottom end, said upper end of said transverse support bar being closely received within said open end, said lower housing having an open top end, said lower end of said transverse support bar being closely received within said open top end, said second biasing means comprising an upper dampening member confined within said upper housing and a lower dampening member confined within said lower housing;

said mounting element being attached to said upper housing and said lower housing such that said mounting element is biased against vertical movement by the upper and lower dampening members.

10. The trailer hitch as defined in claim 9 wherein said upper and lower dampening members comprise resilient solid cushions.

11. The trailer hitch as defined in claim 10 wherein said upper and lower cushions are polyurethane.

12. The trailer hitch as define in claim 10 wherein said cushions are bullet-shaped.

13. A trailer hitch as defined in claim 1 further comprising:

an incremental scale on said outer wall of said draw bar tube, said scale having a plurality of increments; and an indicator on said mounting element in an operational relationship to said scale whereby said indicator points to said scale as an indication of the weight of the load on the hitch.

14. In a trailer hitch apparatus adapted to be removably coupled to a vehicle mounted receiver tube, a shock absorption system for reducing shock and vibration between a trailer and a vehicle simultaneously in the horizontal and vertical directions comprising:

an elongated hollow draw bar tube having an outer wall and an outer end portion, said draw bar tube adapted to be slidably received within the receiver tube, and having a vertically oriented elongated support bar operably attached to said outer end portion;

a horizontal biasing means disposed within said receiver tube for biasing the movement of said draw bar tube relative to the receiver tube;

a mounting element having upper and lower housing portions that overlie said upper end and said lower end of said support bar, said mounting element being vertically slideable relative to said support bar and also being adapted to receive a ball hitch connector; and vertical biasing means interposed between said support bar upper end and said upper housing portion of said mounting element and interposed between said support bar lower end and said lower housing portion of said mounting element for biasing against vertical movement of said mounting element relative to said support bar.

15. The system as defined in claim 14 wherein:

said horizontal biasing means comprises at least one aperture in said outer wall of said draw bar tube, a slide block adapted to move longitudinally within said draw bar tube, and a first dampening member and a second dampening member;

a retaining means associated with said receiver tube and said aperture for retaining said slide block stationary relative to said receiver tube while allowing longitudinal movement of said draw bar tube relative to the receiver tube, and said first and second dampening members disposed within said draw bar tube to dampen the movement of the draw bar tube relative to the receiver tube.

16. The system as defined in claim 14 wherein said vertical biasing means comprises:

an upper and a lower dampening member.

* * * * *